United States Patent [19]
Meitzner et al.

[11] Patent Number: 5,986,898
[45] Date of Patent: Nov. 16, 1999

[54] SWITCHED-MODE POWER SUPPLY WITH POWER FACTOR CORRECTION

[75] Inventors: Michael Meitzner; Jean-Paul Louvel, both of Villingen-Schwenningen, Germany

[73] Assignee: Deutsche Thomson-Brandt GmbH, Villingen-Schwenningen, Germany

[21] Appl. No.: 09/173,219

[22] Filed: Oct. 15, 1998

[30] Foreign Application Priority Data

Oct. 30, 1997 [DE] Germany .......................... 197 47 801

[51] Int. Cl.⁶ .................................................. H02M 3/335
[52] U.S. Cl. .................................. 363/21; 363/97; 363/56
[58] Field of Search .................................. 363/16, 20, 21, 363/39, 40, 97, 131, 50, 55, 56; 323/249, 255, 908

[56] References Cited

U.S. PATENT DOCUMENTS

| | | | |
|---|---|---|---|
| 4,486,823 | 12/1984 | Palm | 315/411 |
| 5,349,515 | 9/1994 | Megeid | 363/21 |
| 5,402,330 | 3/1995 | Megeid | 315/411 |
| 5,619,404 | 4/1997 | Zak | 363/21 |
| 5,673,184 | 9/1997 | Rilly et al. | 363/21 |
| 5,673,185 | 9/1997 | Albach et al. | 363/45 |

FOREIGN PATENT DOCUMENTS

| | | |
|---|---|---|
| 736958 | 9/1996 | European Pat. Off. . |
| 700145 | 5/1998 | European Pat. Off. . |
| 4431120 | 3/1996 | Germany . |
| 58-141680 | 11/1983 | Japan . |
| 92/02983 | 2/1992 | WIPO . |

OTHER PUBLICATIONS

*** Corresponds to RCA 87099, A continuation of PCT Appln. PCT/EP91/01448.

Integrated Circuits, Unitrode Corporation, Power Supply Controls, Lloyd H. Dixon, Jr. "High Power Factor Preregulators for Off–Line Power Supplies", pp. 6–1 through 6–14.

*Primary Examiner*—Stuart N. Hecker
*Assistant Examiner*—Y. J. Han
*Attorney, Agent, or Firm*—Joseph S. Tripoli; Joseph J. Laks; Sammy S. Henig

[57] ABSTRACT

Switched-mode power supplies require a power factor correction circuit in order to comply with anticipated regulations for the harmonic load on the line network. In its second current path, which produces a connection between a rectifier element and a tap on the primary winding of a transformer, the switched-mode power supply contains a capacitor which produces current limiting for an inductance in this current path. When the switching transistor is in the switching mode the inductance is charged, when the switching transistor is switched on, in the sense of an energy store until the capacitor is charged. When the switching transistor is switched off, the inductance and the capacitor are discharged via a diode in the direction of an energy-storage capacitor.

9 Claims, 1 Drawing Sheet

SWITCHED-MODE POWER SUPPLY WITH POWER FACTOR CORRECTION

BACKGROUND

The invention is based on a switched-mode power supply having a power factor correction. A switched-mode power supply of this type has been disclosed in DE 196 10 762 A1.

Switched-mode power supplies produce a severely pulsed load on the line network, which leads to harmonic currents on the line network. This load occurs in particular at the voltage peaks of the sinusoidal network voltage, at which points an energy-storage capacitor in the switched-mode power supply is recharged. In order to limit this load from harmonic currents, an increasing number of international regulations are being produced for switched-mode power supplies whose aim is to design future switched-mode power supplies to achieve a more sinusoidal current consumption. The harmonic load on the line network can also be quoted in terms of a so-called power factor.

Another switched-mode power supply with a reduced harmonic load on the line network is disclosed in EP 0 700 145 A2. This switched-mode power supply likewise contains a second current path on the primary side, which has an inductance and a diode and produces a connection between a charge capacitor downstream of the rectifier on the network side and a tap on the primary winding of the transformer. The inductance acts as an energy store which is charged in the phase when the switching transistor is switched on and subsequently emits its energy, in the phase when the switching transistor is switched off, via the diode and the primary winding to the energy-storage capacitor. This charging and discharging process leads to a current drawn from the line network over the entire 360° phase range of the line network, since an unfiltered half-wave sinusoidal voltage of constant polarity is present across the charging capacitor.

EP 0 598 197 A2 discloses a switched-mode power supply having a sinusoidal current consumption, which contains a current pump with a capacitor which is charged via the network rectifier during the phase when the switching transistor is switched on, and emits this stored energy to an energy-storage capacitor when the switching transistor is switched off.

The object of the present invention is to specify a switched-mode power supply of the type mentioned initially, which operates reliably over a wide input voltage range.

BRIEF SUMMARY OF THE INVENTION

The switched-mode power supply according to the invention contains a capacitor in the second current path, which capacitor is arranged, in particular, between the inductance and the tap on the primary winding. This capacitor produces current limiting in the second current path, thus ensuring that the core of the inductance as well as the core of the primary winding, and, in consequence, the core of the transformer do not enter saturation. In consequence, the switched-mode power supply operates reliably over an input voltage range from 190 to 265 V.

The current limiting is particularly important in the event of brief network interruptions. In the event of a network interruption, the switched-mode power supply continues to operate as long as the charge on the energy-storage capacitor is still sufficient. If the network voltage is now reapplied with the energy-storage capacitor in a deep-discharge state, then a high current flows through the inductance, which can lead to saturation of its ferrite material. This situation occurs, in particular, as a result of the fact that, downstream of the inductance, there is still a connection via a diode to the energy-storage capacitor.

Furthermore, the capacitor acts as a damping element at the moment when the switching transistor switches off and thus reduces its dV/dt, which leads to reduced switching-off losses in the switching transistor. The second current path has a current pumping effect whose intensity can be influenced by the inductance and the capacitance of these components.

BRIEF DESCRIPTION OF THE DRAWING

The invention will be explained in more detail in the following text with reference, by way of example, to an exemplary embodiment which is illustrated in the FIGURE, in which:

The FIGURE shows an input circuit for a switched-mode power supply based on the flyback converter principle, with a reduced harmonic load on the line network.

DESCRIPTION OF THE PREFERRED EMBODIMENT

Figure 1:
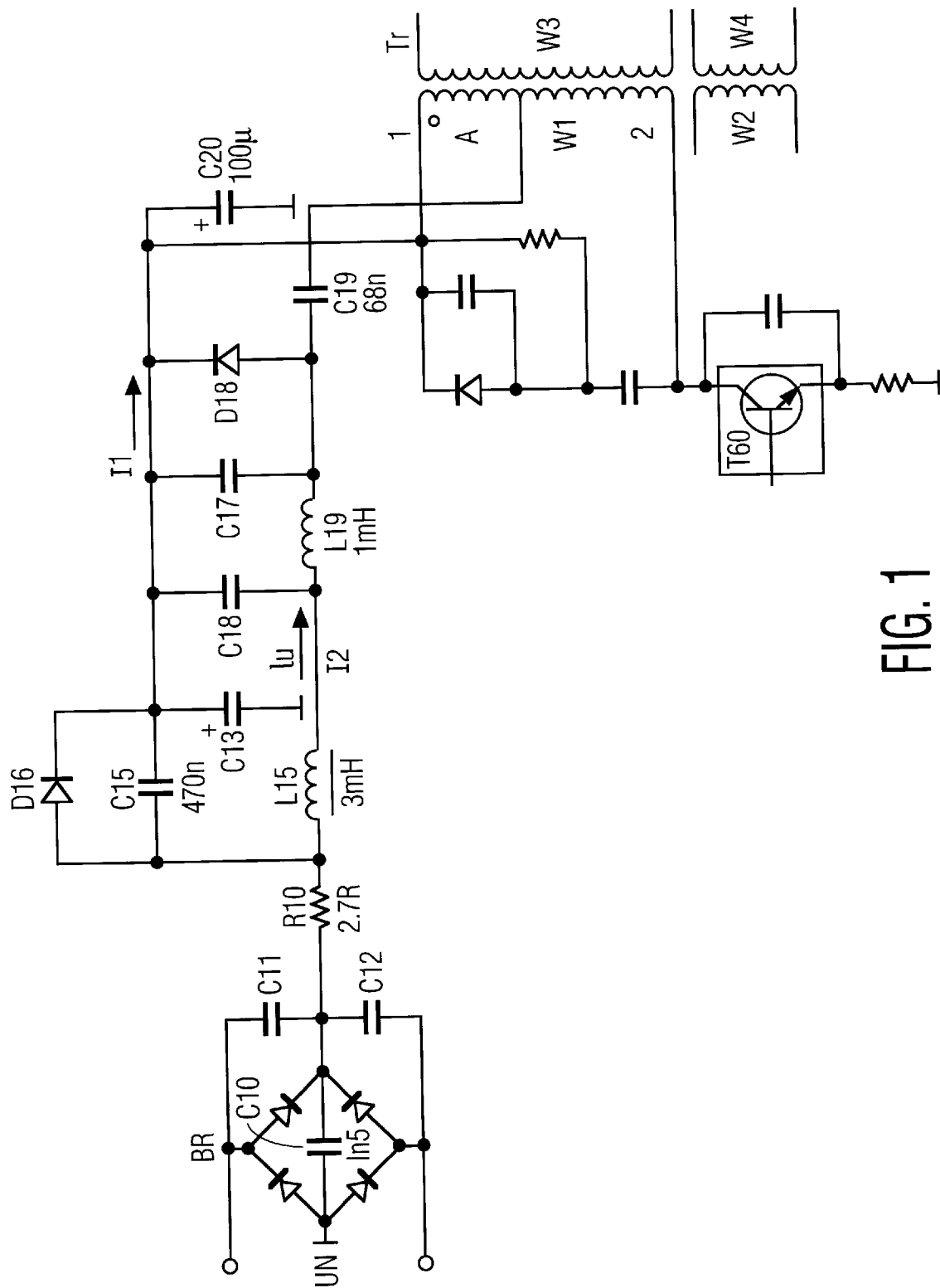

The switched-mode power supply in the FIGURE contains a transformer TR with primary windings W1 and W2 and secondary windings W3 and W4. The primary winding W1 is connected in series with a switching transistor T60 which is switched on and off periodically by a control circuit (which is not illustrated in the FIGRUE), as a result of which energy is transmitted from the primary side to the secondary side of the switched-mode power supply. The primary winding W1 is connected via a first connection 1 to an energy-storage capacitor C20, and via a second connection 2 to the switching transistor T60.

A rectifier element is arranged on the input side, in this exemplary embodiment a bridge rectifier BR which is connected to the network voltage UN. On the output side, the bridge rectifier BR has connected in series with it, respectively, a capacitor 10 with a low capacitance and, downstream of a resistor R10, a first current path I1 with a first diode D16 which leads to the energy-storage capacitor C20, and a second current path I2 with an inductor L15, an inductance L19 and a capacitor C19 which leads to a tap A on the primary winding W1. The inductor L15 has an iron core and represents a damping element together with a capacitor C18 which is connected on one side to the second current path I2 between the inductor L15 and the inductance L19, and on the other side to the first current path I1 downstream of the diode D16.

The capacitor C10 and the resistor R10 produce only a small amount of smoothing of the output signal which is present on the bridge rectifier BR, so that a rectified sinusoidal voltage is essentially still present downstream of the resistor R10. If this sinusoidal voltage is higher than the voltage level across the energy-storage capacitor C20, then a current flows via the diode D16 in the first current path I1, and charges the capacitor C20. The diode D16 is connected in parallel with a capacitor C15, which damps the current surges through the diode D16.

The current path I2 produces a further connection for the energy-storage capacitor C20, and this further connection is active in this case over the entire period of the 50 Hz network frequency since, when the switching transistor T60 is switched on, a current always flows via the current path I2 and the tap A on the primary winding W1. In this case, in every phase when the switching transistor T60 is switched on, the inductance L19 is charged in the sense of an energy store, but limited by the capacitor C19, since a current flows through this capacitor C19 only until it is charged. A connection in the direction of the charge capacitor C20 is produced via a diode D18, which is connected on one side to the inductance L19 and the capacitance C19 in the second current path I2, and on the other side to the first current path I1, downstream of the first diode D16. In consequence, the energy in the inductance L19 is passed on directly to the energy-storage capacitor C20 without having to pass over the circuitous route via the tap A on the primary winding W1. When the switching transistor T60 is switched off, then the tap A is at a higher voltage than the voltage across the energy-storage capacitor C20, caused by the stray inductance in the primary winding W1. In consequence, the capacitor C19 and the inductance L19 are discharged via the diode D18. When the switching transistor T60 subsequently switches on again, then this cycle commences from the start once again.

This current pumping effect is further limited by connecting the second current path to a centre tap, the tap A, on the transformer TR. This prevents the capacitor C20 from being overcharged in the partial load and no-load situations. A centre tap is particularly advantageous if the turns ratio of the primary winding W1 between the first connection 1 and the tap A, and between the tap A and the second connection 2, is about ⅓ to ⅔. Configurations in which the tap A coincides with one of the connections 1 or 2 are, however, also possible.

The current pumping effect of the current path I2 results in the capacitor C20 being charged to voltage levels which may be greater than the peak value of the rectified network voltage UN. In consequence, the current flow through the current path I1 is considerably reduced. It is thus necessary to ensure that the capacitor C20 has an adequate voltage rating. The inductor L15 and the capacitor C18 form an LC element with high inertia, owing to the inductor's iron core. The effect of this current pump also depends on the switching frequency of the switched-mode power supply. This relationship is critical in the case of a switched-mode power supply whose switching frequency is load-dependent since, in this case, the switching frequency increases at a reduced load. This results in the effect of the power factor correction circuit increasing, and the capacitor C20 being charged to an increased extent. The centre tap for the tap A on the primary winding W1 can be selected in an appropriate manner to prevent this capacitor from being overcharged.

A switched-mode power supply of this type can be used in particular for consumer electronics equipment with a relatively high power consumption, for example television sets. However, applications are likewise possible, for example, for computer monitors and professional equipment. The switched-mode power supply in the FIGURE may be matched appropriately to the requirement, and is thus only exemplary. In particular, the switching transistor T60 need not necessarily be a bipolar transistor, but also covers field-effect transistors and other types of transistors.

The invention is explained, by way of example, in the FIGURE for a switched-mode power supply operating on the flyback converter principle. However, the invention is likewise applicable to other switched-mode power supplies, for example forward converters.

We claim:

1. Switched-mode power supply, comprising:
    a rectifier element, an energy-storage capacitor, a transformer with a primary winding having a first terminal coupled to said energy-storage capacitor and a second terminal coupled to a series-connected switching transistor;
    a first current path having a first diode for coupling said rectifier element and said energy-storage capacitor; and
    a second current path having an inductance and a second capacitor for coupling said rectifier element and a third terminal of said primary winding, and a second diode for coupling said energy-storage capacitor to said second current path.

2. Switched-mode power supply according to claim 1, wherein the capacitance of the second capacitor is selected in such a manner that current limiting is obtained in the second current path.

3. Switched-mode power supply according to claim 2, wherein the current limiting is selected in such a manner that saturation of the core of the inductance and of the primary winding is prevented.

4. Switched-mode power supply according to claim 2, wherein the second capacitor is arranged between the inductance and the third terminal.

5. Switched-mode power supply according to claim 4, wherein the connection point of the second diode to the second current path is located between the inductance and the second capacitor.

6. Switched-mode power supply according to claim 1, wherein the turns ratio of the primary winding between the first and third terminals, and between the third and the second terminals is about ⅓ to ⅔.

7. Switched-mode power supply according to claim 1, wherein an L-C element is located in the second current path, upstream of the inductance, for damping, and wherein a capacitor of said L-C element is coupled to the first current path.

8. Switched-mode power supply according to claim 1, wherein a corresponding capacitance is coupled in parallel with the first diode and with the second diode.

9. Switched-mode power supply according to claim 1, wherein the switched-mode power supply operates in one of the flyback converter principle and the forward-converter principle.

* * * * *